Figure 1:
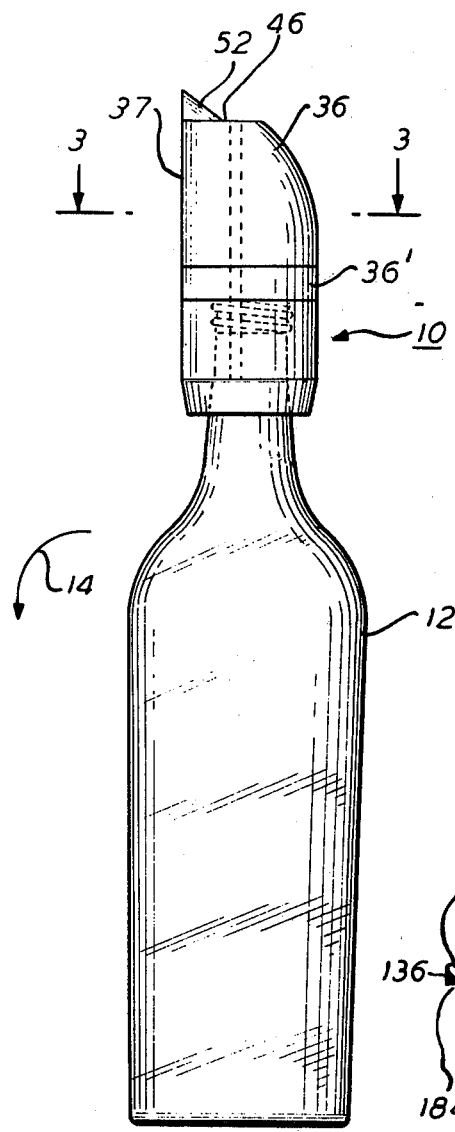

United States Patent [19]

Towns et al.

[11] 4,116,371
[45] Sep. 26, 1978

[54] METERING DEVICE AND METHOD

[75] Inventors: Edward Johnson Towns, Convent Station; Edward Morris Brown, Livingston, both of N.J.

[73] Assignee: Neil Hugh Downing, Katonah, N.Y.

[21] Appl. No.: 780,106

[22] Filed: Mar. 22, 1977

[51] Int. Cl.[2] ............................................. G01F 11/26
[52] U.S. Cl. .................................... 222/455; 222/478
[58] Field of Search ................ 222/454, 455, 584, 478

[56] References Cited

U.S. PATENT DOCUMENTS 1,066,127  7/1913  Lewis ................................... 222/455

FOREIGN PATENT DOCUMENTS 230,293   3/1959  Australia ................................. 222/455
492,973   4/1954  Italy ....................................... 222/455
501,057  11/1954  Italy ....................................... 222/455

Primary Examiner—Robert B. Reeves
Assistant Examiner—Frederick R. Handren

[57] ABSTRACT

A metering device includes a fluid receiving chamber disposed above a container when upright, an opening in the receiving chamber for receiving fluid from the container when inverted, a vent tube connecting the ambient to the container interior, and a volume measuring chamber beneath and connected to the receiving chamber via a relatively large fluid passage. The opening has a predetermined spaced relationship above the measuring volume chamber for dumping fluid in excess of the measured volume back into the upright container and a given spaced relationship with respect to the fluid passage. A fluid deflecting shield surrounds the opening which faces away from the fluid flow when the container is uprighted. The shield, the orientation of the opening, and the given spaced relationship are arranged to divert the fluid flowing from the receiving chamber to the fluid passage around the opening. A pour chamber receives the measured volume when the container is inverted for preventing the measured volume fluid from returning to the receiving chamber through the fluid passage.

7 Claims, 6 Drawing Figures

U.S. Patent  Sept. 26, 1978  Sheet 1 of 3  4,116,371

METERING DEVICE AND METHOD

The present invention relates to metering devices for measuring and pouring a volume of a fluid.

Some prior art metering and pouring devices in the form of spouts are used to dispense liquor type drinks. The liquor, being a relatively expensive commodity, is poured to a predetermined measure commonly referred to as a "shot." "Shot" glasses also are widely used to provide this measure. In one instance, the pouring spout is merely a nozzle attached to the bottle for providing an easy pour into the "shot" glass. Often to save time, employees of establishments using such techniques may forego the "shot" glass and estimate the measured pour by "eye". This method can be costly due to the excess volumes that might be poured.

Other pouring spouts are available for providing premeasured "shots" during the pouring processes, however, such devices are relatively slow and inconvenient. Such devices may provide a measured flow incorporating moving elements in a valve system and a sequence of chambers. These are costly and complex to manufacture. An improved device using a sequence of chambers without a moving element valve system is disclosed and described in co-pending patent application Ser. No. 729,995 filed Oct. 6, 1976 entitled Metering Device and Method and assigned to the assignee of the present invention.

In that prior application, the device includes a receiving chamber to which fluid flows through a receiving port when the container is inverted. When the container is uprighted fluid in the receiving chamber dumps through a dump passage into a lower measuring chamber. The receiving chamber volume is made greater than the measuring chamber volume so that the fluid dumped into the measuring chamber overfills this chamber into the receiving chamber via the dump passage. This overfilled fluid has a level above the port opening in the receiving chamber and, thus, flows back into the container to provide an accurate measure determined by the spaced relationship of the port opening to the volume of the measuring volume below this opening. Under certain circumstances, depending upon operator manipulation, a sufficiently large volume of fluid may flow through the receiving port opening when the container is uprighted from the inverted position such that the lower chamber may receive less than the desired measure (at least to the port opening).

In the present invention, a metering device of the type just described includes fluid diversion means for diverting the fluid around the receiving port opening into the dump passage when the container is righted from the inverted position.

IN THE DRAWING

Figure 3:
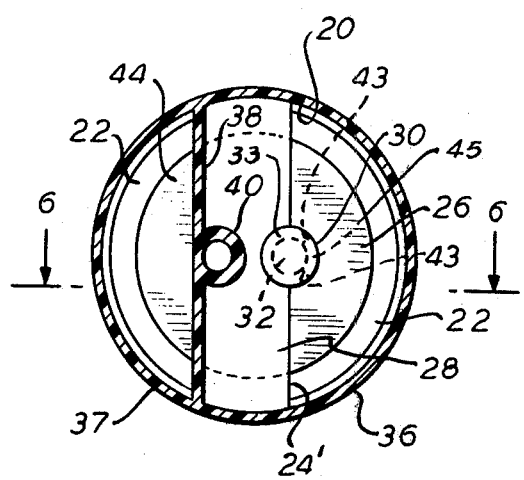
Figure 4:
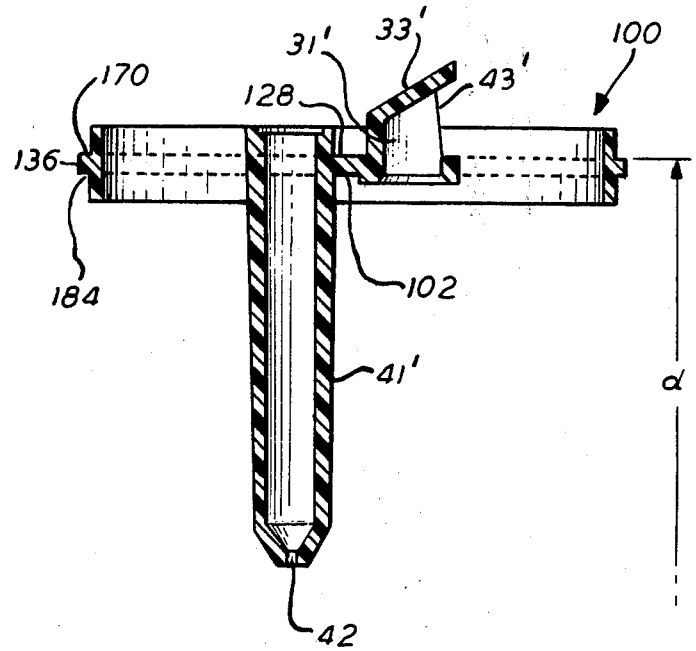
Figure 2:
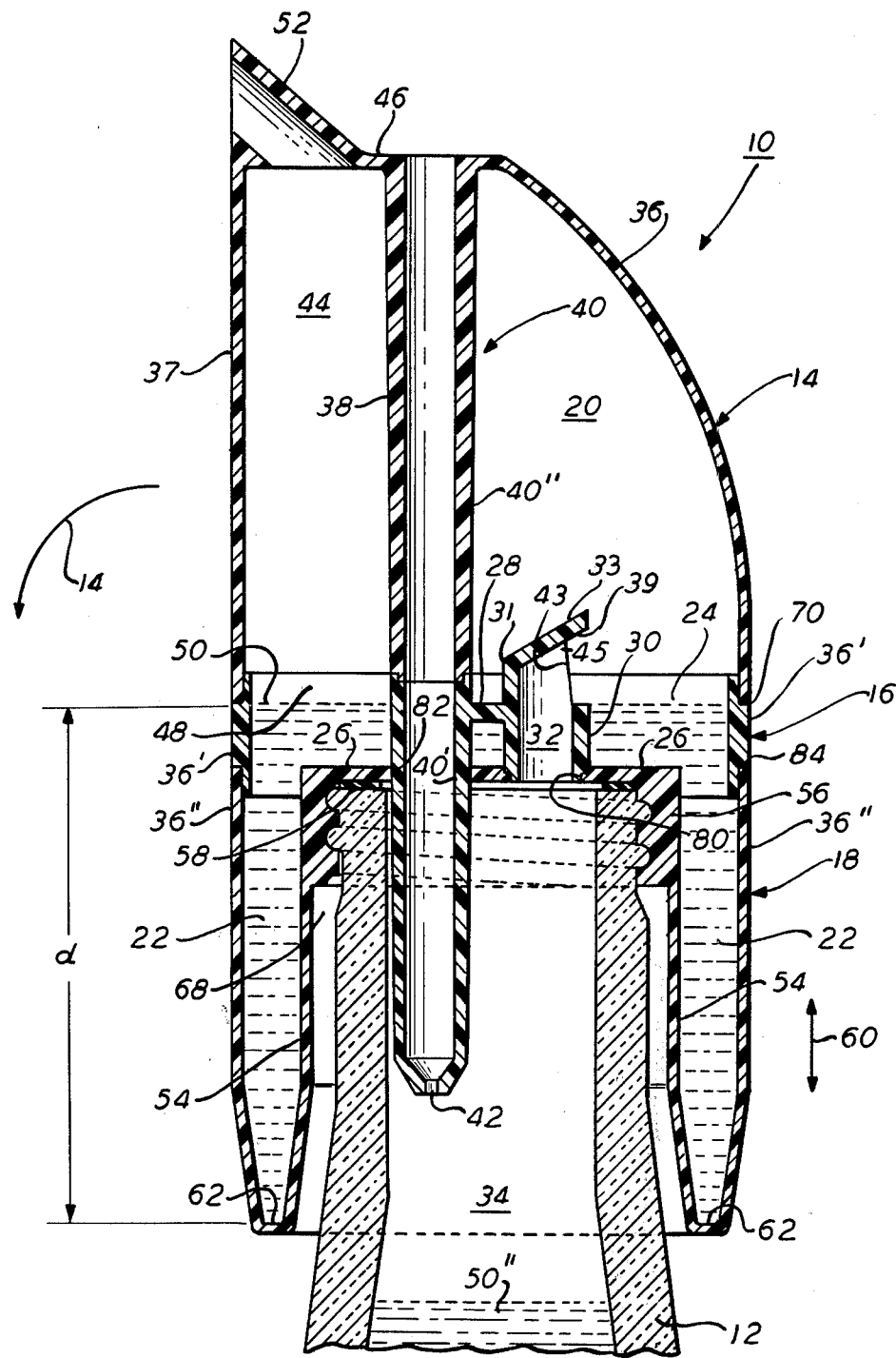
Figure 5:
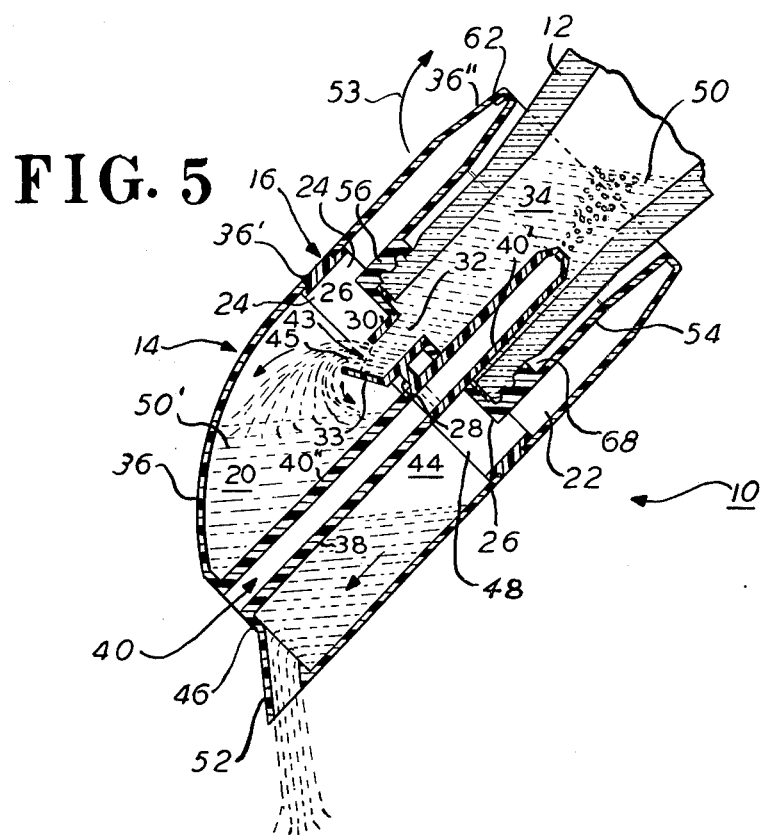
Figure 6:
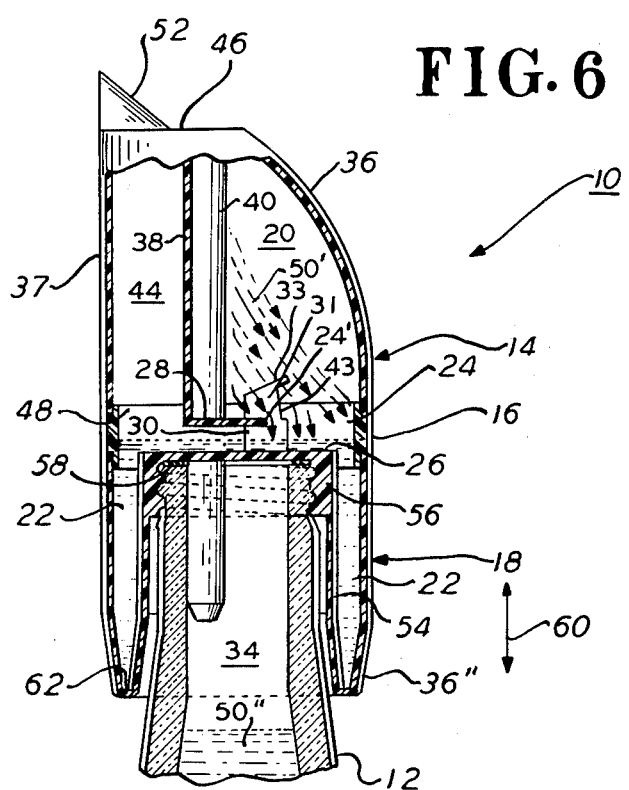

FIG. 1 is a elevation view of a pouring and metering device constructed and operated in accordance with an embodiment of the present invention, FIG. 2 is a elevation sectional view through the device of FIG. 1, FIG. 3 is a plan sectional view through the device of FIG. 1 taken along lines 3—3, FIG. 4 is a elevation sectional view of a second embodiment of a volume determining member for use in the device of FIG. 1, and FIGS. 5 and 6 are elevation sectional views of the device of FIG. 1 illustrating the operation of the device.

In FIG. 1, metering spout 10 is threaded to a bottle 12 and is shown in the upright position with respect to gravity. The spout 10 is a passive device (no moving parts) which automatically provides a measured volume of liquid stored in bottle 12 when the bottle 12 is inverted direction 14 from the position shown to the pour position. Each time the bottle is placed in the upright position spout 10 stores and measures a volume of liquid which is almost instantaneously dispensed when the bottle 12 is tipped to the inverted position. As will be described, spout 10 also includes a feature by which the liquid may be poured continuously through the spout in addition to providing a premeasured volume. This continuous pour feature is especially valuable in those instances where intermittent "shots" are not desired and a continuous pour is desired. Further, upon completion of the continuous pour mode, when the bottle 12 is reverted to the upright position the spout 10 is once again ready to pour a premeasured volume.

With reference to FIGS. 2 and 3, spout 10 is formed of three thermoplastic members 14, 16 and 18 with no moving parts which readily assemble and which may be secured by a suitable cement (not shown). The separate members 14, 16 and 18 are provided for the purpose of ease of manufacture from suitable thermoplastic molds and for simplicity of construction. The members are readily molded in a conventional manner as known in the thermoplastic molding art.

Prior to discussing the construction of each of the members 14, 16 and 18 as separate pieces, the following describes the construction and operation of spout 10. Spout 10 includes an upper storage chamber 20 and a lower liquid volume measuring chamber 22 in fluid communication with upper chamber 20 through dump opening 24. Chamber 20 is defined by bottom wall 28, outer wall 36, and inner upstanding side wall 38 which is joined to wall 36 at the sides and top, and to bottom wall 28 at the wall 36 lowermost edge. Opening 24 is formed by the edge 24' (FIG. 3) of wall 28 and by wall 36'. As can be seen in FIGS. 2 and 3, a large portion of chamber 22 is open to chamber 20.

Wall 28 is a relatively narrow planar strip which extends across the opening formed by wall 36 approximately centrally in plan as seen in FIG. 3. One edge (elongated) of wall 28 is integral with wall 38 forming a fluid seal therebetween. The opposite narrow ends of wall 28 are joined to wall 36. The edge 24' opposite the edge at wall 38 is cantilevered above wall 26 forming the opening 24. Integral with wall 38 is vent tube 40 which extends between wall 46 and the bottle 12 interior 34. The exterior wall of tube 40 is integral with wall 38 and thus also forms a wall of chamber 20. Vent tube 40 is open at the upper end (through wall 46) to the ambient and at the lower end (in interior 34) tapers to a small vent aperture 42. Wall 38 with tube 40 divides the upper interior volume of the spout into a second chamber 44 which is further defined by outer wall 37, top wall 46, and bottom wall 26. There is an opening 48 in wall 26 between chambers 44 and 22. This opening permits immediate emptying into chamber 44 of the liquid 50 stored in chamber 22 when the spout is tipped in direction 14 as will be explained. Disposed in top wall 46 is suitable apertured nozzle 52 for dispensing the measured volume of liquid 50 from chamber 44 into the ambient when the spout is tipped in direction 14.

Chamber 22 is a ring shaped chamber which straddles the upper neck of bottle 12. The outer wall of chamber 22 is formed by coextensive substantially cylindrical walls 36" and 36'. Wall 36" depends downwardly from walls 36 and 37 via intermediate wall 36'. The lowermost edge of wall 36" is joined to an inner concentric substantially cylindrical wall 54 via bottom wall 62. Inner wall 54 terminates at its upper end in a relatively thicker internally threaded section 56 which is threaded to receive the bottle 12 threads. A gasket 58 is disposed between the bottle 12 upper lip and the underside of bottom wall 26 to bottle 12 interior 34. Tube 40 extends through wall 26 in a fluid tight seal with wall 26. Thus no fluid flows between the tube 40 and wall 26 when the bottle is tipped in direction 14. Wall 26 is essentially a disk which forms a bottom wall for chamber 22 within the central area defined by wall 54.

A conduit 30 integral with wall 26 extends upwardly from wall 36. Conduit 30 has a hole 32 which is in fluid communication between interior 34 and chamber 20. Conduit 30 can be a cylindrical tube. The line of edge 24' wall 28 intersects hole 32 approximately centrally (FIG. 3). Edge 24' is closer to wall 38 than the perimeter edges 43 forming opening 45. Conduit 30 extends above wall 28 forming an extension 31. A segment of extension 31 facing away from tube 40 is open to chamber 20. The axial upper end of conduit 30 is capped with a cover 33. Cover 33 in plan is circular. Cover 33 is disposed at about a 45° angle with the plane of wall 28. Cover 33 overhangs the segment of conduit 30 open to chamber 20 at 39. The extension edges 43 (two) taper as shown to form an enlarged opening between hole 32 and chamber 20. In essence, Conduit 30 above wall 28 has a transverse opening 45 which faces away from wall 38. Cover 33 and extension 31 form a fluid shield as will be explained.

Chamber 22 is elongated in direction 60 and relatively narrow in width between walls 36" and 54 in the transverse direction forming a thin elongated doughnut-like chamber. This is important for the reason that with such construction small changes in volume of a fluid in chamber 22 produce relatively large changes in depth of fluid. For example, to illustrate this relationship, the spacing between walls 36" and 54 can be about 0.150 inches while the depth from wall 26 to wall 62 within chamber 22 can be about 1.5 inches. Thus, control of the depth of the liquid 50 in chamber 22 provides a simple, but accurate control of the volume of liquid 50. The determining factor for measuring the volume of liquid 50 in chamber 22 when upright is the distance $d$ of the upper surface of wall 28 facing chamber 20 above the inner surface of wall 62. This volume is the measured volume to be provided by spout 10. This is the volume of chamber 22. Any liquid which may temporarily exist above wall 28 when in the upstanding position, FIG. 2, will flow through transverse opening 45 and thence through hole 32 into the interior 34. It is readily apparent that distance $d$ determines the volume of chamber 22. Thus, volume 22 is determined by walls 36", 62, 54, 26, exterior upstanding wall 36', conduit 30 and tube 40.

In operation, spout 10 is threaded to bottle 12 so that wall 26 is sealed against the upper lip of the bottle. Vent tube 40 extends into interior 34 for venting ambient air directly into interior 34. Except for hole 32, wall 26 completely seals the interior 34 from chambers 20, 22 and 44. At this time there is no liquid in any portion of spout 10. In use, the bottle is inverted in direction 14 so that the nozzle 52 is beneath chamber 44 similar to the position seen in FIG. 5. The angle to which the spout 10 is inverted is not critical. Liquid 50 within interior 34 pours through hole 32 and opening 45 into chamber 20.

Chamber 20 is made larger in volume than chamber 22 so that at all times the liquid 50' in chamber 20 will overfill chamber 22 at least to or above wall 28. The bottle is held in this position for a few seconds until chamber 20 is filled with liquid 50'. This can be determined by the appearance of liquid pouring out of nozzle 52 via the opening 24 between chamber 20 and chamber 22. The liquid flows directly into chamber 44 from chamber 20 out nozzle 52 between walls 26 and 28. The bottle is now reverted to the upstanding position of FIG. 6. The liquid 50' in upper chamber 20 almost immediately dumps through opening 24 into lower chamber 22. The liquid may splash onto wall 26 and then spill over into chamber 22.

As seen in FIG. 5 in the pour mode the liquid is contained by a cavity formed by wall 38 and the surrounding upstanding walls formed by walls 36 and 28 (when in the inverted position). As the bottle is reverted to the upstanding position of FIG. 6 it is tilted in direction 53. This tilting action causes the liquid 50' in chamber 20 to slosh against wall 26, cover 33, and extension 31. No liquid enters the opening 45 since the opening 45 is situated above the liquid 50' level when the spout is horizontal (90° from the position of FIGS. 1 and 2). As the bottle and spout are further tilted in direction 53 the liquid flows downward against and over cover 33 splashing and flowing into opening 24. Remembering that edge 24' of wall 28 is closer to wall 38 than edges 43 forming opening 45, the liquid reaches edge 24' first and immediately spills into chamber 22. As the bottle is further tilted the flowing action of the liquid flows the liquid around extension 31 and cover 33 into chamber 20. Thus negligible liquid enters opening 45. It is apparent that any liquid entering opening 45 will return to the bottle interior. This is undesirable.

The return of the bottle to the upright position takes a matter of seconds. When in the upright position most of the liquid will have emptied from chamber 20 via opening 24. In FIG. 6, the large quantity of liquid 50' is shown exaggerated for purposes of illustration only.

Once in the upright position the liquid 50' overfills chamber 22 into chamber 20 at a level above wall 28 since chamber 20 is larger than chamber 22. The liquid above wall 28 is excess, flows through opening 45 into hole 32 above wall 28 and returns to interior 34 of bottle 12. Because cover 33 and extension 31 prevent the flow of liquid into hole 32, hole 32 can be enlarged and need not have any specific ratio with respect to the size of opening 24 as described in the aforementioned copending application Ser. No. 729,995 filed Oct. 6, 1976. Thus rapid transfer of liquid can take place due to the relatively large openings between chambers and yet provide accurate measurement with no moving elements or valves.

While liquids are illustrated, it is apparent that other fluids can be used whether they be a loose granular medium such as salt, sugar, powdery substances, or gases which are heavier than air and which would fill chamber 22 by gravity action when in the upright position. The flow of the fluid in all cases is by gravity.

It should be apparent that as liquid flows from upper chamber 20 through opening 24 into chamber 22 the volume of liquid formerly in chamber 20 must be displaced by air. This air is provided by vent tube 40. The air flows through vent tube 40 into interior 34 and thence through hole 32 into chamber 20. Thus, the transverse area of tube 40 also has an importance with respect to providing sufficient air flow to chamber 20 as the liquid dumps into chamber 22. The relatively smaller aperture 42 at the lower end of tube 40 prevents the flow of any substantial amount of liquid 50 when the bottle 12 is tipped to the inverted position, it being undesirable for liquid to flow out of vent tube 40 into the ambient, as can be appreciated. The relative transverse areas of tube 40, hole 42, hole 32 and hole 24 can be determined by one of ordinary skill in the fluid mechanics art. The following relationships are given as illustrative only and are not to be construed as limiting. Tube 40 can have an upper diameter of about 0.2 inches and an aperture 42 diameter of about 0.045 inches for an alcoholic liquid. Hole 32 can have a smaller diameter of about 0.2 inches. Wall 28 can be spaced from bottom wall 62 distance $d$ of about 1.67 inches above wall 62 for a ⅝ ounce volume 22. The inner transverse diameter of wall 36" can be about 1.73 inches. Other relationships are noted above in the exemplary embodiment.

To dispense the measured volume of liquid 50 stored in chamber 22, the bottle 12 is tipped to the inverted position direction 14 to the position of FIG. 5. Liquid 50 immediately pours almost instantaneously into chamber 44 due to the absence of any restriction between chambers 22 and 44 filling chamber 44 to the extent of the volume of measured volume of liquid 50. This almost instantaneously filling of chamber 44 is important for the reason that when the bottle is tipped in the inverted position it is undesirable that any of the liquid 50 flows through hole 24 back into chamber 20 during the pour mode. This action is further prevented by wall 28 which directs the liquid to chamber 44. A relatively smaller aperture is provided in nozzle 52 to conveniently pour the liquid from chamber 44 to the ambient.

During the emptying of chamber 44 it is apparent that simultaneously therewith chamber 20 is being filled with liquid from interior 34 through hole 32 and opening 45. The volume of liquid from chamber 44 with respect to the volume of chamber 20 is made such that chamber 44 will empty prior to chamber 20 filling. The time interval between the emptying of chamber 44 and the filling completely of chamber 20 is preferably set in the range of about 1–4 seconds. This interval can be altered as desired by altering, for example, the volume relationships of chambers 22 and 20. It is to be understood that once chamber 20 fills completely, liquid will continuously flow through opening 24 to opening 48 into chamber 44 and out nozzle 52. At this time there will be no longer a measured volume but a continuous pouring of liquid until such time the bottle is reverted to the upright position. It will thus be apparent that the end of the pouring of the measured volume is signaled by a cessation of flow of liquid through nozzle 52 for that set time interval of a few seconds. During that time interval, the bottle 12 may be reverted to the upright position. In this instance, an accurate, premeasured volume of liquid 50 will have been poured and measured by the spout 10.

Once the bottle is placed in the upright position, then the measuring action described above will repeat. In essence, the liquid in chamber 20 will pour through opening 24 into chamber 22 overflowing into opening 45 as described above providing a premeasured volume for the next pour. The distance $d$, FIG. 2, determines this premeasured volume by determining the height of opening 45 above chamber 22.

As mentioned above, the spout 10 is provided with three members 14, 16 and 18. Member 16 includes integral molded bottom wall 28, conduit 30, and peripheral wall 36'. Also molded integral with bottom wall 28 is lower vent tube section 40'. Disposed in the upper edge of wall 36' is shoulder 70 for receiving cylindrical walls 36 and 37 at their lowermost edges. Connected with the upper end of lower tube section 40' is upper tube section 40" which is molded integral with walls 36, 37, 38, 46, and nozzle 52. Conduit 30 depends from wall 28 and is cemented to wall 26 at hole 80. Tube section 40' is cemented to a suitable hole 82 in wall 26. Walls 26, 54, 62 and 36" and section 56 form member 18. Walls 36' and 36" interface at a suitable shoulder 84 in wall 36'. It is thus apparent that three simple molded thermoplastic members 14, 16, and 18 can be inexpensively manufactured and readily cemented together to form spout 10.

Conveniently, member 16 may be provided in a number of different configurations wherein the dimension $d$, FIG. 2, may have different values while utilizing members 14 and 18 of an identical configuration of that shown and described in connection with FIG. 2. For example, in FIG. 4, member 100 may replace member 16 of FIG. 2. It will be noted the vent tube section 40' hole 42 may be the same in construction as that of the corresponding tube section of member 16. Member 100, however, has a relatively narrow wall 136 disposed between shoulders 170' and 184' as compared to wall 36', FIG. 2. Bottom wall 128 has a lower most surface 102 which is contiguous with the upper surface of wall 26. Conduit 130 is absent in this construction. As a result, the dimension $d$ is reduced, reducing the volume of chamber 22 accordingly. By providing a number of differently constructed members 100 having outer walls of different heights such as walls 36' and 136 and a bottom wall 128 disposed different distances $d$ above chamber 22, with conduit 30 of different lengths connected between walls 28 and 26, a number of different predetermined volumes can be provided chamber 22 with few parts. It is to be understood that such modifications to member 16 and member 100 may be provided by one of ordinary skill in the fluid mechanics art.

What is claimed is:

1. A measuring and pouring spout for dispensing measured quantities of fluid from a container comprising:

a housing including means for connecting the housing to the container, means dividing the housing into a first fluid receiving chamber and a second smaller fluid measuring and storage chamber, fluid inlet conduit means connecting said first chamber to the interior of said container such that when the container is tilted to an inverted position, fluid flows through said conduit means into said first chamber, fluid dump conduit means connected between said first and second chambers for dumping fluid from said first chamber to said second chamber when said container is reverted to the upright position from said tilted position, said second chamber being below said first chamber when said container is upright, and fluid discharge means disposed on one side of the housing at the upper portion of said second chamber when upright for discharging fluid from said second chamber when said container is inverted, said fluid inlet conduit means having an opening positioned in fluid communication with said first chamber and oriented to face in a direction away from said one side of said housing, said inlet conduit means serving as a volume determining drain for fluid in said first chamber when upright for draining fluid to the container interior through said opening and inlet conduit means and producing a measured volume in said second chamber upon completion of the draining to the level of said opening, said dump conduit being located closer to said one side than said opening for transferring the fluid to said second chamber prior to the flow of fluid into said opening during the righting of said container from the inverted position whereby said inlet conduit means drains said fluid after the container is righted, said means dividing the housing including a platform having an edge opposite said one side suspended above said second chamber when upright and spaced from the housing wall opposite said one side, the space between said edge and said housing wall opposite said one side forming said dump conduit means, said opening being disposed further from said one side than said platform edge.

2. The spout of claim 1 wherein said fluid inlet conduit means includes fluid shield means surrounding said opening facing the top of said first chamber and said one side to divert fluid flowing from said first chamber around said opening into said dump conduit means.

3. The spout of claim 1 wherein said dump conduit has an opening perimeter defining a first plane substantially normal to the plane defined by the perimeter of said fluid inlet conduit means opening, said fluid inlet conduit means opening plane extending substantially in an upright direction when said container is upright.

4. A measuring and pouring spout for dispensing measured quantities of fluid from a container comprising:

a housing including means for connecting the housing to the container, means dividing the housing into a first fluid receiving chamber and a second smaller fluid measuring and storage chamber, fluid inlet conduit means connecting said first chamber to the interior of said container such that when the container is tilted to an inverted position, fluid flows through said conduit means into said first chamber, fluid dump conduit means connected between said first and second chambers for dumping fluid from said first chamber to said second chamber when said container is reverted to the upright position from said tilted position, a vent tube extending through said first and second chambers with one end open to the ambient atmosphere and the other end open to said container interior, said second chamber being below said first chamber when said container is upright, and fluid discharge means disposed on one side of the housing at the upper portion of said second chamber when upright for discharging fluid from said second chamber when said container is inverted, said fluid inlet conduit means having an opening positioned in fluid communication with said first chamber and oriented to face in a direction away from said one side of said housing, said inlet conduit means serving as a volume determining drain for fluid in said first chamber when upright for draining fluid to the container interior through said opening and inlet conduit means and producing a measured volume in said second chamber upon completion of the draining to the level of said opening, said dump conduit being located closer to said one side than said opening for transferring the fluid to said second chamber prior to the flow of fluid into said opening during the righting of said container from the inverted position whereby said inlet conduit means drains said fluid after the container is righted.

5. A fluid metering and pouring device comprising:
a first chamber,
a second smaller chamber below the first chamber when upright,
conduit means for supplying a fluid to said first chamber when the chambers are inverted,
a dump conduit between said chambers for dumping fluid from said first chamber to said second chamber when upright,
shield means disposed about said conduit means in said first chamber forming an opening in said conduit means and oriented to divert the flow of fluid in said first chamber around said conduit means opening while said chambers are being uprighted from the inverted position, said conduit means opening draining the fluid in excess of a given volume from said chambers after said chambers are uprighted to produce a measured volume in said second chamber,
means including a chamber dividing wall between the chambers having an edge above said second chamber when upright and spaced from one side wall of said first chamber, the space between said edge and said one side wall forming said dump conduit means, said opening being closer to said one side wall than said edge, and
a discharge opening coupled to said second chamber for discharging the fluid in said second chamber when said chambers are inverted, said discharge opening being located adjacent a side wall of said first chamber opposite said one side.

6. The device of claim 5 wherein said shield means forms said opening in said first chamber, said opening being spaced further from said discharge means than said dump conduit in a direction transverse the upright direction so that said fluid flows into said dump conduit prior to reaching said opening.

7. A fluid metering and dispensing device with no moving parts for dispensing a measured volume of a fluid comprising:
a first housing,
a first upstanding wall dividing said first housing into first and second chambers, said first chamber having a fluid discharge opening in communication with the ambient,
a second dividing wall extending from said upstanding wall for enclosing said second chamber,
a second housing beneath the first housing forming a third lower chamber smaller than said second chamber when said chambers are upright, said third chamber being in fluid communication with said first chamber so that fluid flows to said first chamber when the chambers are inverted,
first conduit means formed in said second dividing wall and spaced transversely from said upstanding wall a given distance, said first conduit means forming a fluid connection between said second and third chambers, and second conduit means having an opening in said second chamber spaced transversely from said upstanding wall a distance greater than said given distance, said last-mentioned opening facing away from said upstanding wall so that fluid flows into said first conduit means when said chambers are uprighted from a tilted inverted position without flowing into said last-mentioned opening, said last-mentioned opening draining said fluid from said chambers in excess of said measured volume after said chambers are uprighted.

* * * * *